April 25, 1967
E. HENRY-BIABAUD
3,316,031
HYDRAULIC BRAKING SYSTEM DISTRIBUTOR WITH DAMPING MEANS
Filed July 19, 1965
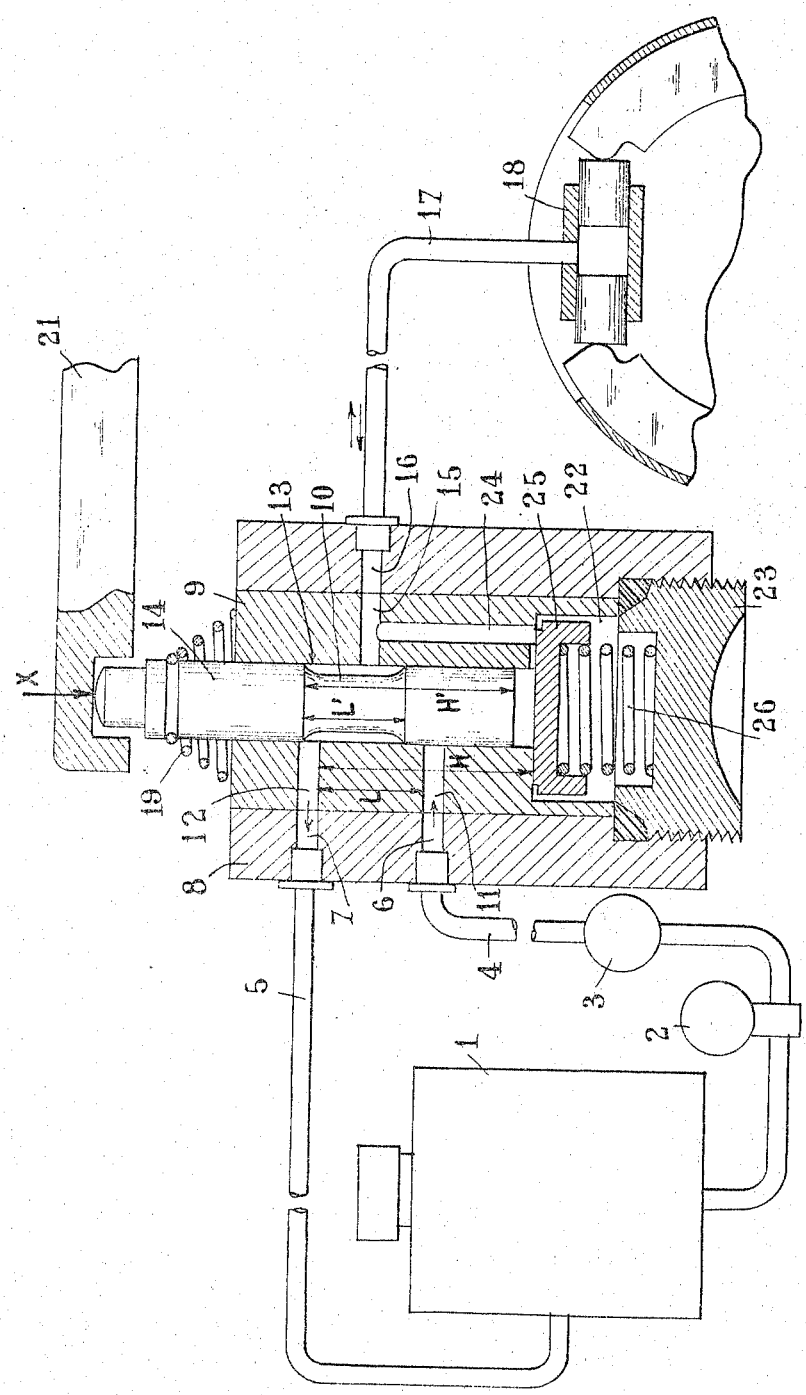

United States Patent Office 3,316,031
Patented Apr. 25, 1967

3,316,031
HYDRAULIC BRAKING SYSTEM DISTRIBUTOR WITH DAMPING MEANS
Edmond Henry-Biabaud, Paris, France, assignor to Societe Anonyme Andre Citroen, Paris, France
Filed July 19, 1965, Ser. No. 472,834
Claims priority, application France, July 22, 1964, 982,601, Patent 1,409,866
3 Claims. (Cl. 303—50)

This invention relates to a distributor of a hydraulic braking system of a vehicle.

A hydraulic braking system of vehicle is already known wherein, between a source of fluid under pressure (reservoir, pump and accumulator if necessary) and each brake cylinder transmitting the braking force to the brake shoes, a pressure metering distributor is provided of which the slide valve is actuated by means of the brake pedal.

In this known type of distributor the slide valve is rigid with a piston adapted to damp out any vibrations likely to occur during the brake application.

In the inoperative position of said distributor it is advantageous to keep the distributor orifice connected to the return pipe line leading to the fluid reservoir in a wide open condition to permit a rapid release of the brake shoes, thus reducing to a minimum the risk of leakage in the pressure feed line.

This arrangement makes it necessary for the driver to exert an effort during a relatively long stroke (of the order of ⅛″) for overcoming the loss of pressure caused by the damping piston during the stroke of said slide valve from its inoperative position to its operative or inlet position.

The effort to be exerted by the driver on the brake pedal is proportional to the rapidity with which it is desired to produce the braking action. In the case of a fierce brake application, this effort is not a nuisance, but when it is desired to produce rapidly a light brake applications, it is far from negligible and removes "fineness" from the desired brake application.

It is the object of the present invention to avoid this inconvenience.

To this end, the distributor according to this invention to be incorporated in the braking system of an automotive vehicle, which is disposed between a source of liquid under pressure and at least one brake cylinder, comprising a slide valve actuated by means of a brake pedal and a piston slidably mounted in a chamber of the distributor body and constituting therewith a device capable of damping out the slide valve vibration, is characterized in that said vibration damping piston is mounted separately from said slide valve in said chamber and urged by a spring against the bottom of said chamber and the orifice of the bore in which said slide valve is mounted, this slide valve engaging and moving said damping piston only at the end of the stroke providing the braking position.

Due to the fact that the damping piston is not rigidly connected to the distributor slide valve during the greater part of the stroke leading to the braking position, this stroke can take place rapidly and effortlessly as long as the slide valve is not abutting against the damping piston. On the other hand, since the major portion of the stroke leading to the braking position takes place effortlessly, it is possible in the inoperative position of the slide valve to fully open the exhaust port of the distributor body which is connected to the fluid reservoir.

A typical form of embodiment of the present invention will now be described by way of example with reference to the single figure of the attached drawing showing in longitudinal axial section a distributor constructed according to the teachings of this invention and incorporated in a hydraulic braking system of a vehicle.

Although a single brake and brake cylinder are shown in this figure, it will be readily understood by those conversant with the art that the distributor according to this invention may be used for feeding a plurality of brake cylinders.

In the drawing, the hydraulic braking system illustrated comprises a unit adapted to deliver fluid under pressure, this unit comprising a reservoir 1, a pump 2 and a fluid accumulator 3. This unit is connected through a pressure pipe line 4 and a return pipe line 5 leading to the reservoir, respectively to an inlet port 6 and an exhaust port 7 formed in the body 8 of the distributor. In a central bore 8 formed in the same body a relatively thick sleeve 9 is force fitted and has radial ducts 11 and 12 formed therein which are in axial alignment, and communicate with, the aforesaid ports 6 and 7 respectively. The sleeve 9 has also formed therein an axial bore 13 in which a valve member 14 is slidably mounted. This slide valve 14 has formed in its intermediate portion a relatively wide groove 10 which, in the inoperative position shown in the drawing, provides a fluid connection between the exhaust duct 12 and another radial duct 15 formed in said sleeve 9, the duct 15 registering with another port 16 formed in the distributor body which is connected through another pipe line 17 to the brake cylinder 18.

The slide valve 14 of the distributor is constantly urged to its inoperative position by a compression spring 18 engaging the top or outer face of sleeve 9. The axial movement of the slide valve 14 is caused by a force X exerted by means of a lever 21 actuated by the brake pedal (not shown), this lever 21 being for example a compensator lever of a braking-effort apportioning device.

The bore 13 in which the valve member 14 is slidably mounted opens into a chamber 22 of greater diameter which is formed in the sleeve 9. This chamber is closed at its outer end by a screw plug 23 engaging a tapped bore of the distributor body 8. This chamber 22 is also connected through a longitudinal duct 24 to the axial duct 15 leading through the port 16 to the brake cylinder pipe line 17.

Enclosed in this chamber 22 with a certain radial clearance is a vibration damping piston 25 urged in the inoperative position against the bottom of chamber 22 and the orifice of the axial bore 13 by a compressing spring 26 reacting against the aforesaid screw plug 23.

From the drawing it will be seen that the greater part of the stroke necessary for moving the slide valve 14 to its braking position takes place without interfering with the damping piston 25. It is only during the last fraction of this stroke that the lower end of the slide valve engages the damping piston 25 and then moves the latter downwards. When the slide valve is in this braking position, in which its groove 10 connects the inlet duct 11 to the duct 15 leading to the brake cylinder 18, the vibrations of the slide valve 3 about its position of equilibrium which might be produced during the brake application are thus damped out by the piston 25 acting as a hydraulic damper in conjunction with the chamber 22.

The width $L'$ of groove 10 formed in slide valve 14 is very slightly less than the distance $L$ between the adjacent generatrices respectively of ducts 11 and 12 (about 0.012″). On the other hand, the length $H'$ of slide valve 14 which is measured betwen the upper end of its groove 10 and the lower end of the slide valve is equal or very slightly greater than the distance $H$ measured from the lower generatrix of duct 12 and the bottom of chamber 22. Under these conditions, and provided that a sufficient clearance is left between the bottom face of slide valve 14 and the upper face of piston 25, the orifice of the exhaust duct 12 is wide open in the inoperative position of slide valve 14, whereby the brake shoes will be rapidly released when the driver releases the brake pedal; on the other hand, the slide valve 14 may be brought rapidly and effortlessly in the braking position during the greater part of its stroke.

What I claim is:

1. Distributor of a hydraulic braking system of a vehicle which is responsive to a brake pedal, said distributor being disposed between a source of fluid under pressure and at least one brake cylinder and comprising a body, a bore formed in said body, a slide valve movable in said bore between an inoperative position and a braking position and responsive to said brake pedal, a chamber formed in said distributor body, said bore leading into said chamber through an orifice, the end of said slide valve, in the inoperative position of said slide valve, being spaced from said orifice, a vibration damping piston housed in said chamber and spaced from said slide valve, a spring disposed in said chamber and urging said piston against said orifice of said bore in which said slide valve is mounted, whereby said slide valve will engage and move said damping piston only during the last fraction of the slide valve stroke to its braking position.

2. Distributor as set forth in claim 1, comprising a return spring associated with said slide valve which engages said distributor body, externally of said body, and adapted constantly to urge said slide valve to its inoperative position.

3. Distributor as set forth in claim 1, comprising an inlet duct and an exhaust duct formed in said body whereby said inlet duct be nearer to said bore orifice than said exhaust duct, said ducts opening respectively through inlet and exhaust orifices into said slide valve receiving body, an annular groove formed in the periphery of said slide valve, the width or longitudinal dimension of said groove being slightly less than the distance measured between the nearest points of said inlet and exhaust orifices, the distance measured between the end of the slide valve which engages said damping piston through said bore orifice and the limit of said groove which is remotest from said end of said slide valve being equal or very slightly greater than the distance measured between the plane of said bore orifice and the nearest point of said exhaust orifice.

No references cited.

EUGENE G. BOTZ, *Primary Examiner.*